United States Patent [19]

Olsen

[11] Patent Number: 4,511,250
[45] Date of Patent: Apr. 16, 1985

[54] APPARATUS FOR MEASURING SCALAR IRRADIANCE

[75] Inventor: Arthur A. Olsen, Boulder, Colo.

[73] Assignee: Ball Corporation, Muncie, Ind.

[21] Appl. No.: 284,424

[22] Filed: Jul. 20, 1981

[51] Int. Cl.³ .............................................. G01J 1/42
[52] U.S. Cl. ................................... 356/225; 356/218
[58] Field of Search .............. 356/218, 236, 215, 213, 356/225

[56] References Cited

U.S. PATENT DOCUMENTS 4,310,246  1/1982  Blazek .................................. 356/236

OTHER PUBLICATIONS

ERBE Project Team, ERBE Conceptual Design Review Data Package, No. QQEM006-1, Dec. 26, 1979.
E. Alexander, Preliminary Pointing Subsystem Analyses, No. QQEE024-1, Dec. 21, 1979.
N. Wright, Calibration Plan for Earth Radiation Budget Experiment (ERBE), No. D02538A, Dec. 14, 1979.
Memo with enclosures from B. R. Barkstrom to ERBE Science Team, Subject: Two-Channel vs. Three-Channel MAM Baffles.

Primary Examiner—Bruce Y. Arnold
Attorney, Agent, or Firm—Gilbert E. Alberding

[57] ABSTRACT

An apparatus for measuring the scalar irradiance of a given vicinity produced by all sources over a given angular range. The apparatus includes a planar array of convex spherical surfaces, a detector oriented toward the array, and a shielding plate having holes which abut and secure the convex spherical surfaces.

2 Claims, 6 Drawing Figures

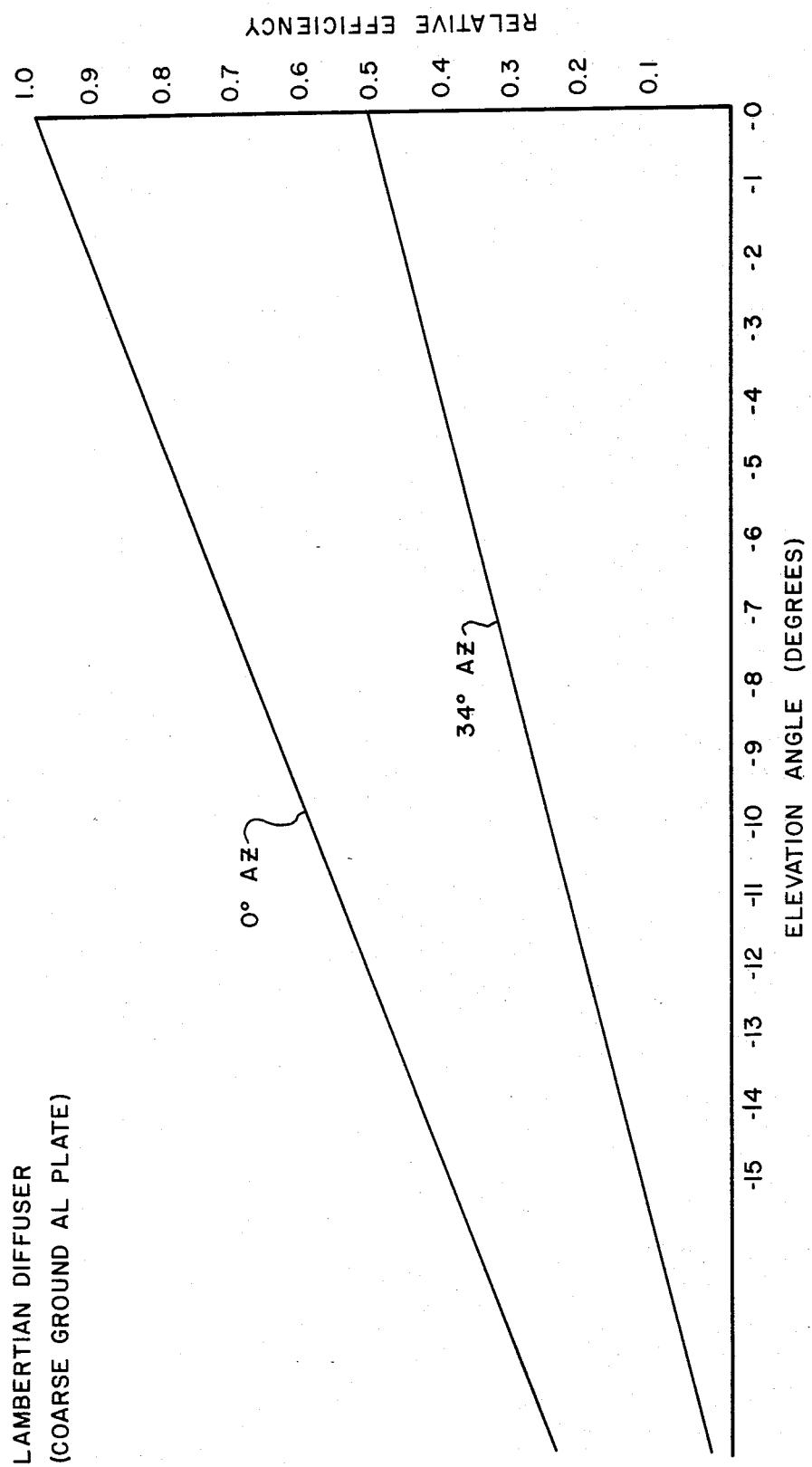

APPARATUS FOR MEASURING SCALAR IRRADIANCE

The present invention relates to an omnidirectional apparatus and method for measuring the irradiance produced at a given location by single or multiple sources.

In a variety of scientific endeavors it is desirable to measure the electromagnetic radiation level at a particular point in space. For example, in radiometry of the earth from space, it is sometimes necessary to measure the solar irradiance, either to calculate the earth's reflectance (albedo) or to calibrate a radiometer. In terrestrial applications, such as the study of aquatic photosynthetic organisms, it is desirable to determine the total optical energy input available from all directions for photosynthesis.

Present instrumentation available to experimenters in the above and like areas is generally direction sensitive. Many electromagnetic energy sensing devices exhibit a cosine response; i.e., the response varies with the cosine of the angle of incidence of the electromagnetic radiation on the measuring instrument. Therefore, in radiometry of the earth from space, such prior art instruments must be acccurately oriented if precise results are to be obtained. In terrestrial applications where the total radiation level from all directions is desired, a number of measurements must be made at different orientations with a compilation of the results.

This directional characteristic of present instrumentation is also present in the definitions which are applicable to the measurement of electromagnetic radiation levels. The general term used to indicate an electromagnetic energy level is irradiance which has the units of watts per square centimeter and is measured at a perpendicular to the incoming light. This term suffices to describe the desired quantity in single source situations, such as radiometry in outer space, and in situations where the total energy falling on a planar surface, such as a bank of solar cells, if desired. This term, however, is always direction associated and is of little use where the total electromagnetic energy from all directions is desired to be measured, such as in the study of aquatic photosynthetic organisms, or where a limited angular field is desired to be measured yet a direction unweighted response is sought. Although neither the CIE-IEC (International Commission on Illumination) nor the ANSI (American National Standards Institute) has a term or a symbol to describe the nondirectional scalar field quantity of electromagnetic energy level, in *Self-Study Manual on Optical Radiation Measurements: Part 1—Concepts, Chapters 4 and 5*, issued February 1978 by Optical Physics Division, Institute for Basic Standards, National Bureau of Standards, Washington, D.C. 20234, this quantity has been theoretically analyzed and referred to as "scalar irradiance"0 or "fluence rate."

As will be appreciated by those skilled in the art, the scalar irradiance, at a particular vicinity, over a given angular field, may be the same as the irradiance, such as in single source situations; however, an instrument which measures scalar irradiance would be preferable in many applications for it would be omnidirectional over up to $4\pi$ steradians or over any specified and appropriately shielded field of view. This would eliminate the direction sensitivity present instrumentation exhibits in outer space applications and allow a single measurement where the total radiation level is desired.

The present invention relates to a method and apparatus for measuring scalar irradiance. Its response is, at least theoretically, unrelated to the direction of incoming radiation, but it can be appropriately shielded to restrict its view to a specified sector of space, if desired.

SUMMARY OF THE INVENTION

In accordance with the present invention, a spherical surface reflective of the electromagnetic energy to be measured is used to redistribute incoming flux equally in all directions. A sensing means or detector views the spherical surface and provides an output indicative of the level of incoming flux. As will be more fully explained, a spherical reflector has been theoretically determined and empirically verified to redistribute incoming flux uniformly in all directions. Therefore, a sensing means viewing a spherical reflector will indicate the same output regardless of the directional relationship between the source(s), the reflector and the sensor with the proviso that the sensor cannot detect flux from a source which is hidden from it by the reflector. Hence, a spherical reflector or diffuser in combination with a detector comprise a method of measuring scalar irradiance. The spherical surface may be of a convex or concave shape; however, in constructing a precision instrument with high tolerances it will generally be easier and much less expensive to obtain convex spherical surfaces.

In a preferred embodiment of the present invention which is particularly useful in radiometry of the sun from space, a diffuser comprising a planar array of spherical reflectors is provided. The reflectors are partially shielded from one another to minimize or eliminate reflections between them. A detector views the diffuser and thereby measures the scalar irradiance. The array is advantageous as it provides multiple sources for the detector and thereby increases sensitivity and, also, effectively, shields the detector from the earth, yet yields omnidirectional response within a large sector. This response eliminates the orientation sensitivity which prior art instrumentation exhibits. As indicated in the above Background of the Invention portion of the present application, in single source situations, scalar irradiance and irradiance are the same magnitude and the advantage of the present invention in such measurements is that it will yield the appropriate quantity even if not exactly orientated.

It is therefore an object of the present invention to provide an improved flux measurement method.

It is a further object of the present invention to provide a flux measurement method which is free of the strict orientation requirements of the prior art.

It is a further object of the present invention to provide a method which may be used to obtain an accurate indication of scalar irradiance with a single measurement.

It is a further object of the present invention to eliminate errors due to improper instrument orientation in an irradiance measurement.

It is a further object of the present invention to measure the irradiance produced at a vicinity regardless of the direction, movement or distance of the source(s).

It is a further object of the present invention to provide a diffuser yielding high sensitivity through the provision of multiple reflecting surfaces and uniform response over a wide angular range of incident electromagnetic radiation.

It is a further object of the present invention to provide baffling for a diffuser having a plurality of spherical reflecting surfaces to thereby provide omnidirectional response from said diffuser over a predetermined field of view.

BRIEF DESCRIPTION OF THE DRAWINGS

FIG. 5 is a graph of the results obtained with the test setup of FIG. 3 using a Lambertian diffuser.

DETAILED DESCRIPTION OF THE INVENTION

Figure 1:
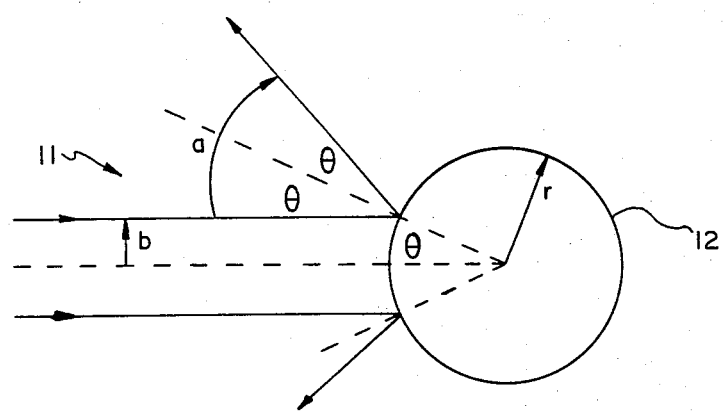
FIG. 1 is a construct of the interaction between a spherical reflector and an incoming beam of light.

A spherical reflector can be shown to redistribute a uniform incoming light beam equally in all directions. Referring to FIG. 1, a light beam 11 has a radius of b and an areas A of $\pi b^2$. The light beam strikes a spherical surface 12 and is reflected into a solid angle W. Considering the solid angle W into which the light reflects:

$$W = 2\pi(1 - \cos a)$$
$$= 2\pi(1 - \cos 2\theta)$$
$$= 2\pi(2 \sin^2 \theta)$$
$$= 4\pi(b/r)^2$$
$$= (4/r^2)A.$$

Taking the change in solid angle W with respect to the change in area A:

$$dW/dA = 4/r^2.$$

The resulting term is independent of the beam radius b. Therefore, assuming the incoming uniform beam has a radius greater than the diameter of the sphere and that a sphere can be manufactured with constant reflectance regardless of the angle of incidence, the sphere is shown to redistribute incoming flux equally in all directions. Therefore, the spherical surface should have a diameter which is relatively small compared to the beam of energy and should be constructed of a material which yields constant reflectance. As is well appreciated in the art, the reflectance of a material is highly dependent on the electromagnetic spectrum under consideration. In the preferred embodiment which is to be used for radiometry from space, the ultraviolet spectrum is of primary importance; i.e., the electromagnetic spectrum between the wavelengths of about 160 nanometers and 400 nanometers. For this range of electromagnetic radiation, stainless steel spherical surfaces are used with an aluminum coating for high and uniform reflectance.

Figure 2:
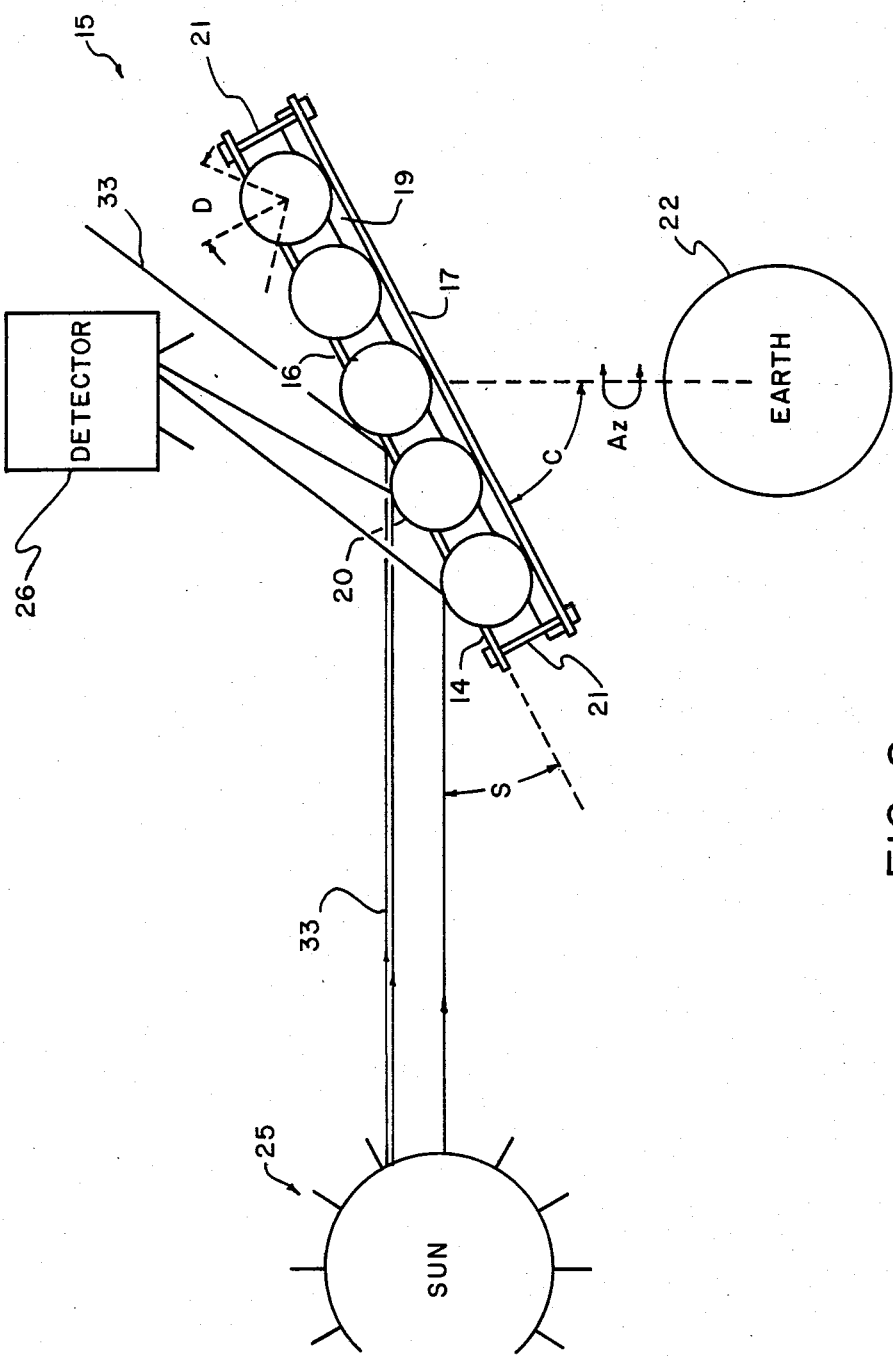
FIG. 2 is an illustration of a preferred embodiment of the present invention using a planar array to measure solar irradiance.

Referring to FIG. 2, a preferred embodiment of the present invention is illustrated for measuring the scalar irradiance from the sun. The instrument 15 includes a spherical reflective surface 20 and a detector 26. The spherical surface is located in view of a radiant energy source, such as the sun 25, and the detector 26. The spherical surface is constructed of a material having relatively constant reflectance over the electromagnetic spectrum to be measured and the detector, likewise, is sensitive to said spectrum and preferably is capable of detecting a number of narrow bands within said spectrum.

In the illustrated preferred embodiment a planar array of spherical reflective surfaces is used to increase the sensitivity of instrument 15. The spherical surfaces are mounted between upper plate 16 and lower plate 17. Lower plate 17 has a thin layer of a compressible substance 19, such as a foam elastomer, between it and the spherical surface to secure the surfaces in a constant position. Any rotation of the spherical surfaces could result in scratching or contamination of the surfaces and/or an inconsistent response from the carefully calibrated instrument. Another means of increasing the sphere's resistance to rotation without employing an elastomer is to grind flat the portion of the sphere contacting lower plate 17. A number of bolts 21 hold the two plates together. Upper plate 16 has countersunk holes 14 which further secure the spherical surfaces in position. An upper plate constructed of thin metal plate without countersunk holes may also perform satisfactorily depending on the specific operating situation.

The upper plate 16 also serves as a baffle as well as securing the spherical reflective surfaces in the planar array. In empirical tests of arrays of spherical surfaces without upper plate 16, it has been found that the response is not omnidirectional and in fact, approaches a Lambertian or cosine response. It is thought that this response can be attributed to multiple reflections from the spherical surfaces which reach the detector. Also, a Lambertian response component may arise from any structure which secures the spherical surfaces in the array formation, such as the bottom plate. To overcome these problems, the upper plate is designed to expose only that portion of the spherical surface which is necessary to allow the detector 26 to see the reflection of the sun over the desired angular field of measurement. In the preferred embodiment, measurements will be taken while sun angle S varies between 13 degrees and 28 degrees and Az varies between plus and minus 34 degrees. Where the detector is positioned at an angle of 28 degrees from perpendicular to the planar array, it has been found that the countersink should expose about 80 degrees of the surface, or considering FIG. 2, angle D should be about 40 degrees.

When using the array of FIG. 2, another problem which will contribute to nonuniform response is any structure which is illuminated by the source and which is visible to the detector. The detector is therefore mounted to limit its view to the array. The Lambertian response component from upper plate 16 is limited by applying a black specular paint to its surface and orienting the array so that over the desired angular measurement range the reflection of the sun off of upper plate 16 will miss the detector, as illustrated by ray 33.

Figure 6:
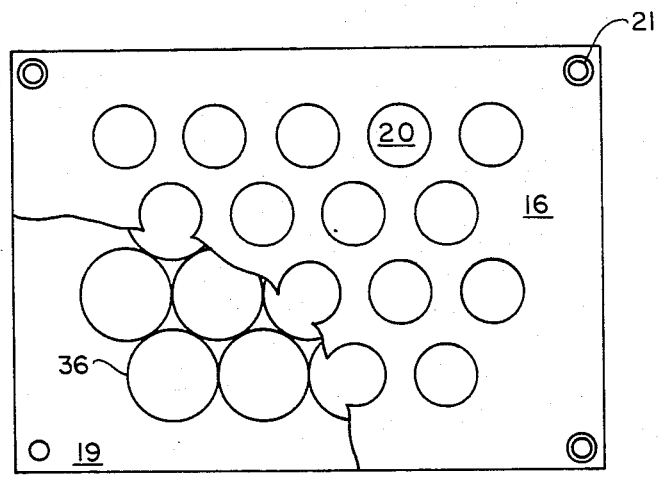
FIG. 6 is a fragmented top view of the planar array used in the preferred embodiment.

Referring to FIG. 6, a top fragmented view of the planar array is illustrated. In the preferred embodiment, the spherical surfaces are packed close together within about 0.01 inches of each other but upper plate 16 obscures a major portion of them exposing only about an 80 degrees cap of reflecting spherical surfaces 20. It is to be understood that the obscured portions 36 of the spherical surfaces underlying plate 16 do not contribute to the operation of the present invention other than to act as a means of securing and a by-product of inexpensively obtaining the exposed spherical reflecting surfaces 20. Therefore, in the preferred embodiment of the present invention, for purely practical reasons, stainless steel balls as used in bal bearings are used to provide spherical surfaces 20, however, as should be apparent to one skilled in the art, the total cap area of a spherical surface for use in the present invention is dependent on the field of view to be measured and the detector placement and the obscured portion 36 is dependent on practical constraints related to mounting and obtaining spherical surfaces at a reasonable cost.

EXAMPLE

A diffuser comprising a planar array of spherical surfaces was constructed in accordance with the above FIG. 2. The spherical surfaces were constructed of one-quarter inch diameter polished stainless steel. To minimize the Lambertian response component from the upper plate, a coating of glossy black paint was applied thereto. The paint was applied using an artist's air brush at 45 pounds air pressure with 40 percent thinner and 60 percent paint. Three coats of the above were applied at 20-minute intervals yielding a very glossy and smooth surface. The paint was cured per manufacturers specifications at 40 to 50 percent relative humidity and 50 degrees centigrade for 48 hours.

A typical Lambertian diffuser was prepared by coarsely grinding one surface of an aluminum plate.

Figure 3:
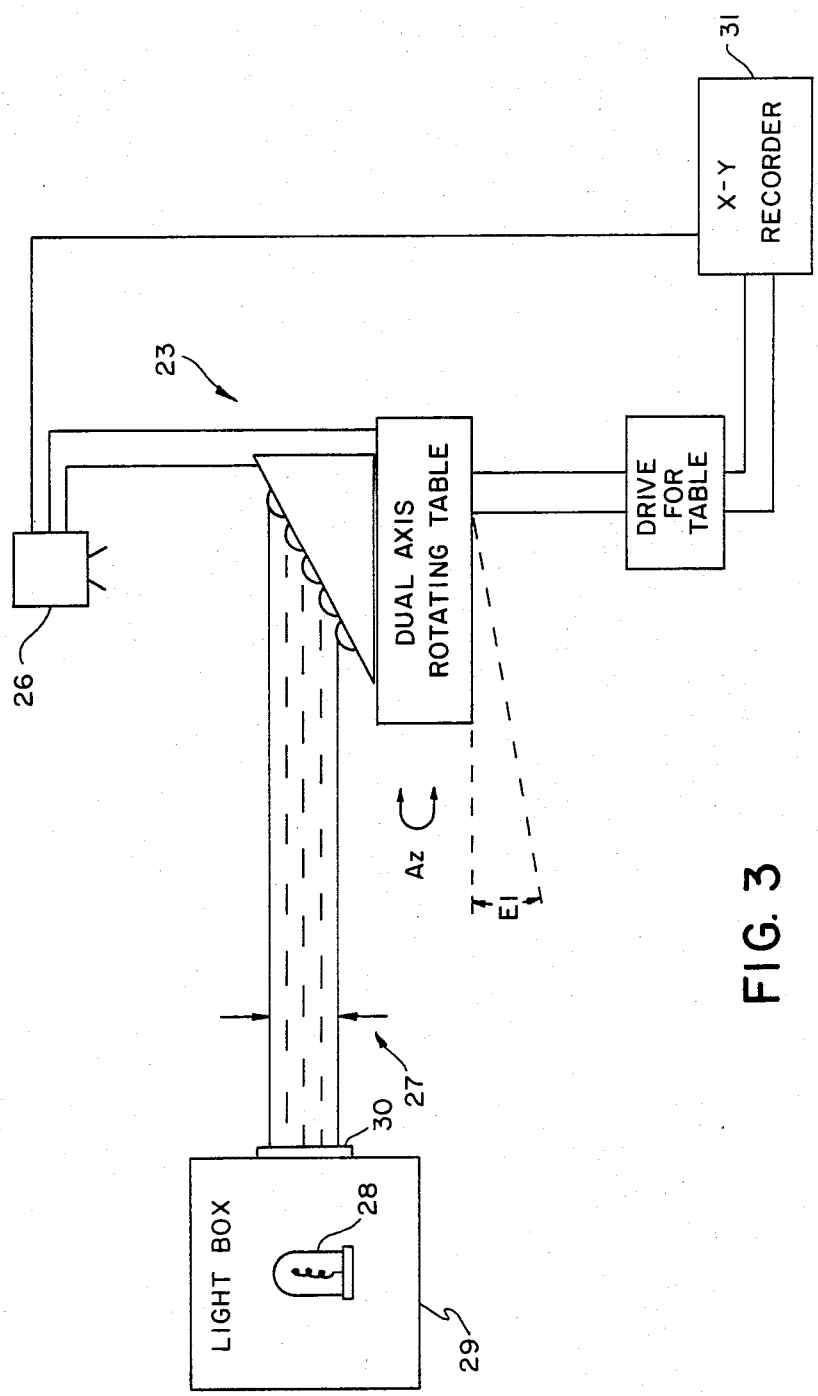
FIG. 3 illustrates a test setup used in empirically testing the planar array of FIG. 2 and a prior art Lambertian diffuser.

The test setup illustrated in FIG. 3 was used to obtain the response of the spherical array diffuser and the ground aluminum plate diffuser over a variety of different angles of incident light. All work was done in a dark room with baffles 27 appropriately placed between the light source and the diffuser/detector assembly to minimize background light problems.

The housing around the diffuser contained honeycombed light traps and an aperture in front of the detector to limit its field of view to the diffuser surface. All traps were painted with flat or glossy black paint.

Figure 4:
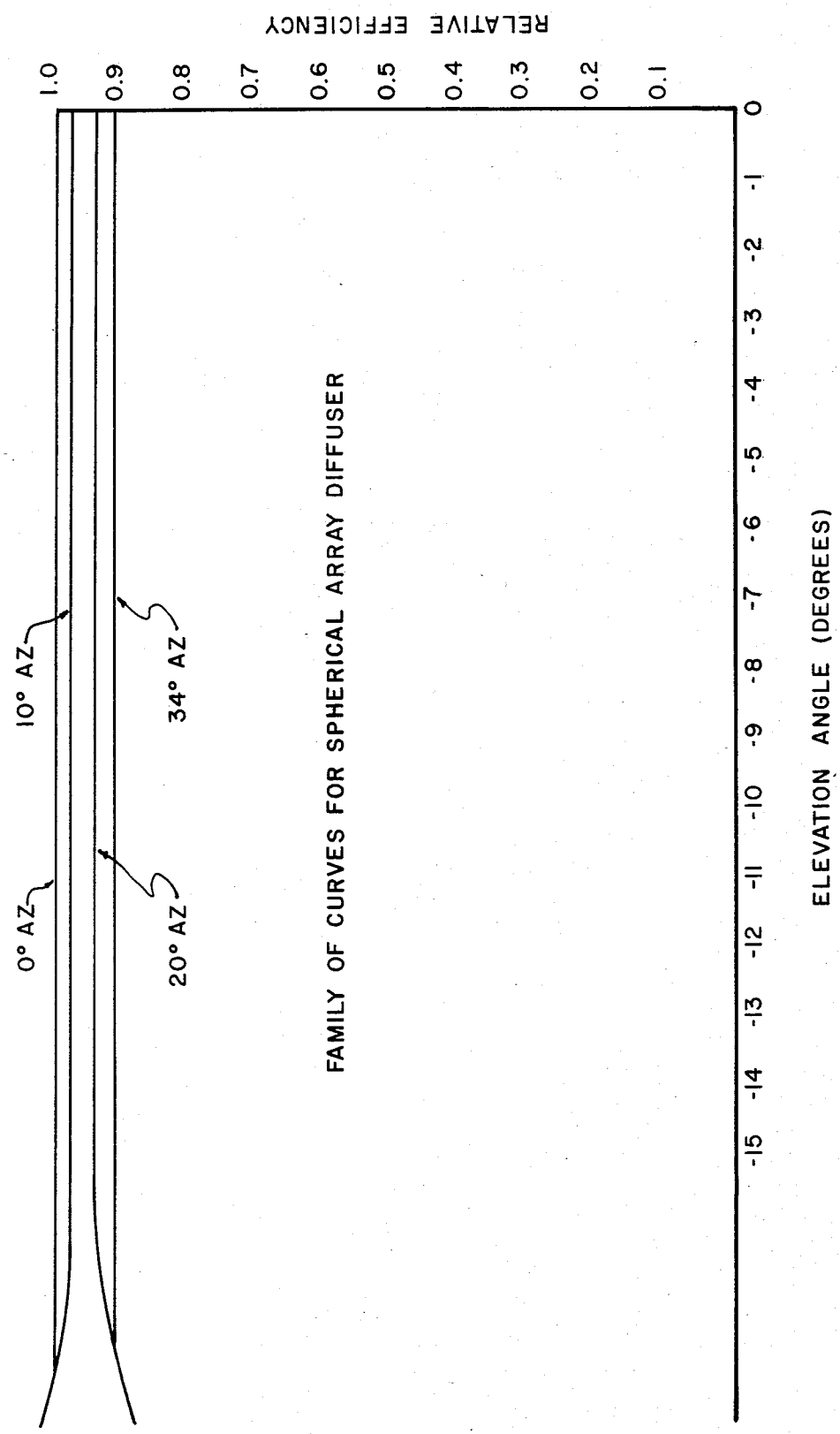
FIG. 4 is a graph of the results obtained with the test setup of FIG. 3 using a planar array of spherical reflectors.

The test setup included a light source 28 in a light box 29. The source was a low-pressure mercury lamp and was filtered through filter 30 which is a 2537 Angstrom bandpass filter. Detector 26 faces downward to a diffuser 23. Both the detector and the diffuser were mounted on a two-axis rotary table. The table was rotatable around an El (elevation) of 0 to minus 15 degrees and an Az (azimuth) of plus or minus 34 degrees. An X-Y recorder 31 recorded the position of one axis of the table and the output from the detector 26. Results are reported in FIG. 4 for the array of spherical surfaces with elevation scans at 0° Az, 10° AZ, 20° Az, and 34° Az. Results for the ground aluminum plate are reported in FIG. 5 for elevation scans taken at 0° Az and 34° Az. As is apparent from comparing the results, the spherical array yielded flat response over elevation scans with under 10 percent variation in response for different azimuths. The ground aluminum diffuser yielded much greater variations in both categories.

The present invention, in its broadest aspects, provides a method of measuring the scalar irradiance at a vicinity in space by uniformly reflecting impinging radiation with a spherical surface and measuring the reflected radiation which reaches a detector positioned to view said spherical surface. In a preferred embodiment, a planar array of spherical surfaces is provided for greater sensitivity. The planar array includes a baffle and also functions as a shield between the detector and the earth when used in the herein described configuration for measuring solar irradiance. The disclosed planar array provides uniform response over a range of angles of incoming electromagnetic radiation.

The foregoing is considered as illustrative only of the principles of the invention. Further, since a number of modifications and changes will readily occur to those skilled in the art, it is not desired to limit the invention to the exact construction shown and described; and, accordingly, all suitable modifications and equivalents may be resorted to falling within the purview of the invention as claimed.

What is claimed is:

1. An apparatus for measuring the scalar irradiance of a given vicinity produced by all sources over a given angular range, comprising:
   a planar array of convex spherical surfaces;
   a detector oriented toward said array;
   shielding between said convex spherical surfaces to limit the portion of each sphere which is within the view of said detector wherein said shielding is a plate having holes which abut and secure said convex spherical surfaces.

2. The apparatus of claim 1 wherein said plate is coated with a specular black coating and wherein said holes are countersunk such that the edges of said holes closely fit said spherical surfaces.

* * * * *